United States Patent [19]
Bell et al.

[11] 4,434,448
[45] Feb. 28, 1984

[54] NON-CONTAMINATING TRANSFORMER OIL PUMP, STATIC ARRESTER, AND CONTROL CIRCUIT

[75] Inventors: Clifford J. Bell, Mt. Pleasant Township, Delaware County; Ramsis S. Girgis, Muncie, both of Ind.

[73] Assignee: Westinghouse Electric Corp., Pittsburgh, Pa.

[21] Appl. No.: 399,507

[22] Filed: Jul. 19, 1982

[51] Int. Cl.³ .............................................. H02H 7/08
[52] U.S. Cl. .......................................... 361/23; 361/1; 308/1 A; 340/682; 310/68 B; 116/208; 200/61.4
[58] Field of Search .......................... 361/23, 1, 22, 20; 308/1 A; 340/682, 683, 686; 200/61.4, 61.42; 310/68 B, 68 R, 68 C; 184/1 C, 1 B; 417/63, 44, 13; 116/208, DIG. 21; 188/1 A

[56] References Cited

U.S. PATENT DOCUMENTS

| | | | |
|---|---|---|---|
| 3,108,264 | 10/1963 | Heinoo | 340/682 |
| 3,508,241 | 4/1970 | Potter | 340/682 |
| 3,897,116 | 7/1975 | Carpenter | 340/682 X |
| 4,057,365 | 11/1977 | Colmer | 308/1 A |
| 4,320,431 | 3/1982 | Bell | 361/23 |
| 4,379,291 | 4/1983 | Hubbard et al. | 340/682 |

*Primary Examiner*—Patrick R. Salce
*Attorney, Agent, or Firm*—L. P. Johns

[57] ABSTRACT

A transformer motor pump unit for circulating a fluid in a transformer characterized by a rotating pump shaft mounted in non-electrically conductive bearings, means for detecting shaft displacement due to bearing wear, and a static arrester grounding the pump shaft and all rotating parts for preventing static electricity buildup on the shaft and subsequent discharge from the shaft to the bearing area. Power circuit means for operating the pump includes the static arrester as a control circuit for tripping the pump out of operation should mechanical failure occur.

10 Claims, 10 Drawing Figures

NON-CONTAMINATING TRANSFORMER OIL PUMP, STATIC ARRESTER, AND CONTROL CIRCUIT

BACKGROUND OF THE INVENTION

1. Field of the Invention

This invention relates in general to fluid-cooled electrical apparatus, such as power transformers and in particular to an improved non-contaminating fluid circulating pump used in such apparatus.

2. Description of the Prior Art

It is well known that fluids, such as transformer oil, moving rapidly through small spaces create and dispell static electrical charges to the surrounding structures. When these charges accumulate on a grounded surface they rapidly and harmlessly are dispersed to ground. If, however, these charges are disposed of by the fluid to an insulated body, that body itself becomes charged. The magnitude of the charge buildup on such an insulated body is limited only by the degree of insulation of the body from ground. When the accumulated charge is sufficient on an insulated body to break down the insulation to ground, the body is discharged to such a point that the insulation, once again, holds the charge on the body. This discharge when moving through a fluid creates an arc which, with metallic materials and other solids, causes pitting of the solids at point of exit and entrance. Pitting is the result of material being eroded from the solid and, in the case of metals, a conducting debris is left suspended in the fluid and is free to move with the fluid, causing damage to bearings and journals.

In a transformer oil pump the rotating parts of the pump, such as the rotor assembly, are necessarily insulated from the stationary parts by natural gaps filled with oil. The moving parts provide ideal conditions for static charge buildup. The smallest of the gaps insulating the rotor is generally between the shaft journal and bearing, and it is across this surface that a discharge would most likely occur. The discharge effectively damages both the journal and the bearing by pitting and further transmits the debris to the oil. When a discharge occurs across the gap of bearing sensor rings and the shaft, even though this is outside of the journal-bearing area (protecting the bearing), debris is generated and subsequently suspended in the transformer oil. This is true for conducting as well as non-conducting bearings. The oil, being the parent insulating fluid moving through the transformer, moves the debris into the transformer, where it is deposited in critical spaces on the solid insulation, or allows it to remain in suspension in the fluid, and, in either case, move into areas of high electrical stress in the main transformer and subject the transformer to failure. By eliminating the formation of static charge buildup on transformer oil pump moving parts, the possibility of discharge to ground, damage to bearings and journals and formation of conducting debris can be eliminated. This can be accomplished by grounding these moving parts.

In a contamination-free pump, it is necessary to have an electrical circuit which guarantees that, should bearing wear occur to a predetermined amount, the power to the motor will be interrupted and the pump stopped. This circuit, to be a general circuit, must take into account all of the various types of power supplies to the pump. These can be grounded wye, grounded deltas, split deltas, ungrounded wye, ungrounded deltas, and others. Because of the variety of possible supplies and because of the difficulty of leads being carried into, through and around the motor parts in the motor housing of the pump, limiting the number of these leads is imperative. To allow the shut off circuit to function then with a minimal number of leads, it is desirable that one side of this "trip circuit" (or alarm circuit as the case may be) be grounded in the motor and ground be used as one complete side of the circuit.

SUMMARY OF THE INVENTION

In accordance with this invention it has been found that a motor pump unit for circulating a cooling fluid within electrical apparatus, such as a liquid-filled transformer, may be provided which comprises a pump and motor mounted on a rotatable, electrically conductive shaft, which shaft is disposed in sleeve bearings of non-electrically conductive material. Electrically conductive contacts are disposed within the bearings for completing an electrical connection to the shaft, thereby detecting shaft displacement in any direction due to wear of the bearings. Circuit means connect the contacts with a motor deenergizing the circuit for deenergizing the stator of the motor when the contacts detect a predetermined bearing wear. Conductor means leads from the shaft to the ground. A circuit interrupter, such as a fuse, of predetermined breakdown rating is grounded and included in the circuit for shutting down the motor when a circuit is closed between the shaft and the contacts in the bearings.

The advantage of the device of this invention is that it provides a simple direct means for eliminating static buildup on the motor shaft and rotor parts of the pump and simplifies a desirable trip circuit by incorporating a unique combination of static arrested to the shaft and an isolation control circuit. The combination of the grounded static arrester and grounded isolated trip circuit enables elimination of static discharge and debris generation from the shaft of the transformer oil pump while providing a simple trip circuit for all forms of power supplied to the pump for shutting down the pump should the bearings fail.

DESCRIPTION OF THE PREFERRED EMBODIMENTS

Figure 1:
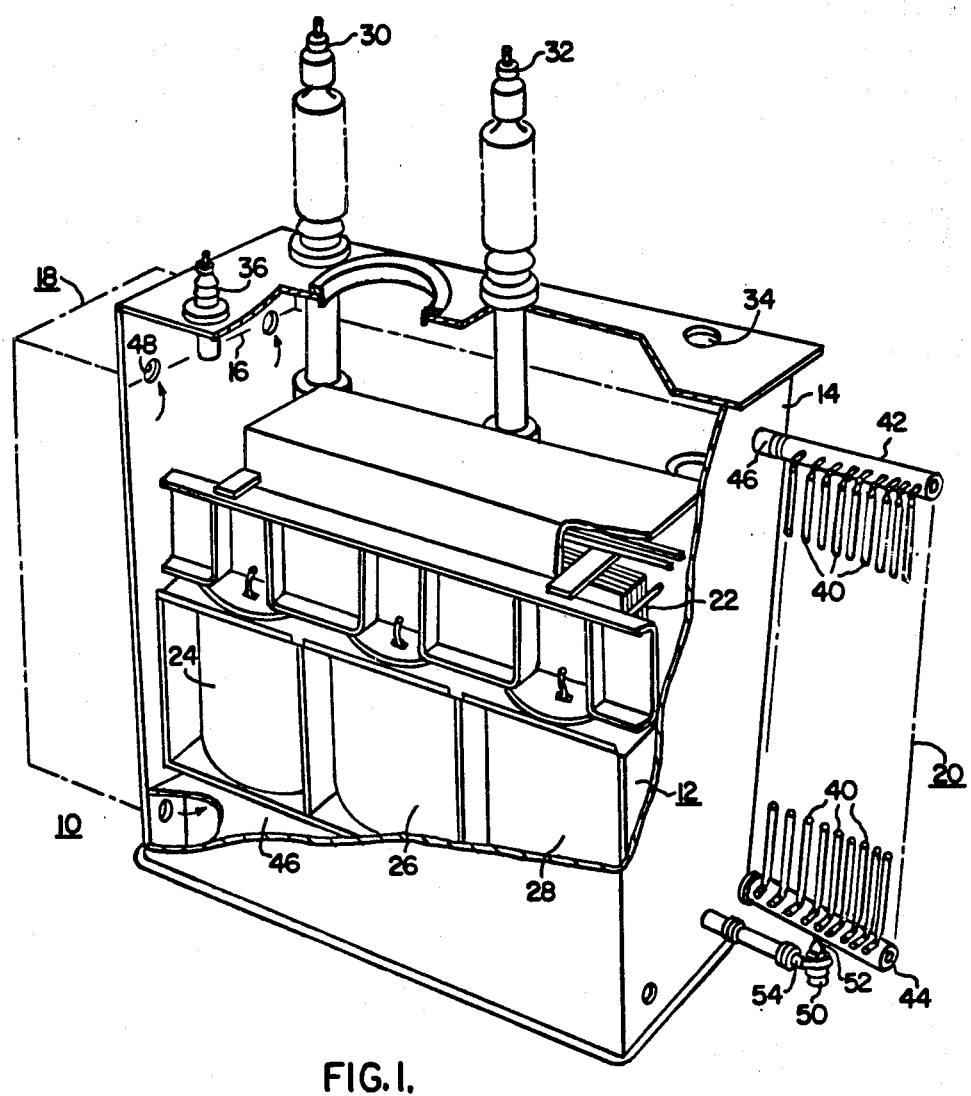
FIG. 1 is a perspective view of a transformer partially cut away and partially in phantom.

In FIG. 1 an electric power transformer is generally indicated at 10 and it includes a magnetic core-winding assembly 12 disposed within a tank 14. The tank is filled to a level 16 with a liquid insulating and cooling medium of dielectric, such as mineral oil, in which the assembly 12 is immersed to aid in insulating the various electrical conductors from one another, and from ground, and for cooling the transformer 10.

Heat exchangers 18, 20 (FIG. 1) are connected to the tank 14 via fluid conductor means with the liquid dielectric circulating therethrough, by forced circulation, to remove heat from the liquid dielectric which it has picked up from the magnetic-winding assembly 12.

Transformer 10, in this example, is a three-phase transformer of the core-form type, but it is to be understood that the invention is applicable to any type of fluid-cooled electrical apparatus, such as transformers, reactors, contactors, and other devices in which fluid movement without contamination due either to metallic particles or non-metallic particles is required.

More specifically, transformer 10 includes a magnetic core 22 and phase winding assemblies 24, 26, 28 disposed about winding legs of the magnetic core 22. Each phase-winding assembly includes low- and high-voltage windings concentrically disposed about a winding leg of the magnetic core, with the high-voltage windings being connected to high-voltage bushings, of which two bushings 30 and 32 are shown in FIG. 1, with the third high-voltage bushing being mounted in opening 34. The low-voltage windings, if connected in wye, have their neutral ends connected to neutral bushing 36, and their other ends are connected to low-voltage bushings disposed on the portion of the tank cover cut away in FIG. 1.

Transformer 10 is cooled by circulating the liquid dielectric upwardly through the tank 14, entering the tank below the barrier 46, which directs the liquid dielectric upwardly through the ducts in the windings in a predetermined pattern. The liquid dielectric leaves the tank through openings disposed in the upper portion of the tank, such as through opening 48, and flows downwardly through heat exchangers 18 and 20, where heat is removed from the liquid dielectric, and then back into the tank below the barrier 46. Each of the heat exchangers, such as heat exchangers 20, includes a plurality of hollow, flat thin-type elements 40, which are in fluid communication with upper and lower headers 42 and 44, respectively. Only a sufficient number of elements 40 and headers 42 and 44 are illustrated in FIG. 1 to properly illustrate the construction, as there are usually a large plurality of rows of such elements in each core or heat exchanger. Further, the heat exchangers may be disposed on one or more sides of the transformer, depending upon the specific rating and cooling requirements of the apparatus. Though this description indicates the flow in one direction, flow may be in a reverse direction with simple success as a coolant.

The upper header 42 is connected directly to tank 14 (FIG. 1) through fluid conductor means, while the lower or collecting header 44 is connected to tank 14 through fluid conductor means which includes a liquid pump 50. The pump 50 includes an inlet 52 which is connected to header 44 via suitable fluid conductor means, and an outlet 54 which is connected to tank 14 again via suitable fluid conductor means.

Because transformers, such as transformer 10, are relatively maintenance-free apparatus, and are generally unattended, the design of pumps, such as pump 50, has been made to ensure this same condition of little or no maintenance. To accomplish this end, pumps are made with an integral, hermetically sealed motor in fluid communication with the pump itself, thus eliminating shaft sealing means and its inherent maintenance. The small portion of the pumped transformer oil that is bled off and circulated through the motor cools and lubricates the motor, thereby making it maintenance free and also allowing a smaller physical size than would be required by alternative designs.

One detrimental effect of a pump of this design that must be guarded against is the contamination of the dielectric fluid being circulated by the pump with metallic or conductive particles from bearings, rotor and stator, etc. generated in the motor area and transported out into the main transformer oil flow by that oil used in cooling the motor. Pump 50 was developed to eliminate this problem of contamination of the dielectric cooling medium with electrically conductive particles, and minimizing contamination with non-electrically conductive particles, and their subsequent circulation throughout the apparatus. Basically, this was accomplished by replacing components subject to frictional wear with non-metallic and non-electrically conductive substitutes wherever possible and by preventing contact of metallic or electrically conductive components where non-electrically conductive substitutes cannot be made. This second aspect of the solution was carried out by providing means for detecting the beginning of bearing failure and shutting down the unit whenever a predetermined amount of bearing wear is detected, thus preventing the circulation of oil or other cooling insulating fluid which has been contaminated with metallic or electrically conductive particles, and/or an uncontrolled amount of non-electrically conductive contaminating particles.

Figure 3:
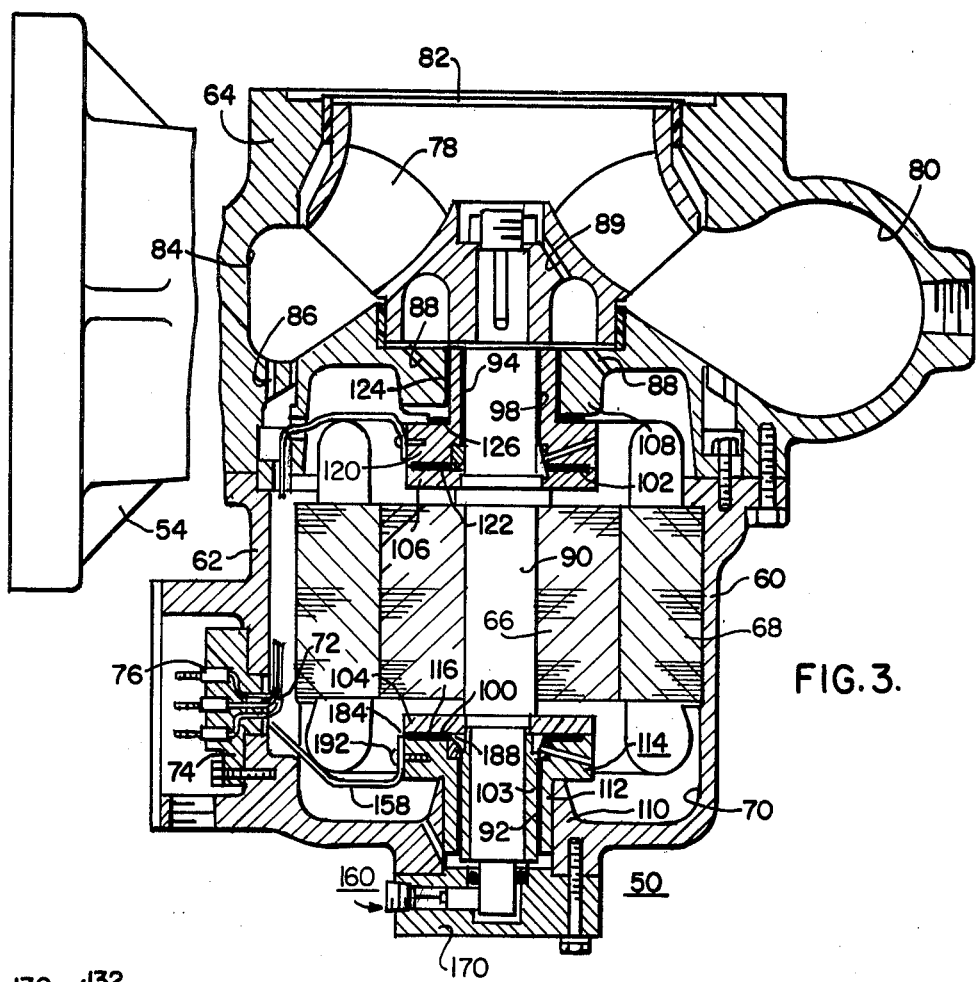
FIG. 3 is a cross-sectional view of a pump constructed in accordance with this invention.

The pump 50 (FIG. 3) comprises a housing 60 having motor portion 62 and pump portion 64. Motor portion 62 includes rotor 66 and stator 68 disposed within motor chamber 70. Rotor 66 and stator 68 are formed of a plurality of turns of a metallic conductor.

Stator 68 is energized by electrical wires 72 in the conventional manner, three wires being shown as would be required for a three-phase motor. Electrical wires 72 pass through fluid-tight plate 74 to terminals 76 which terminals are suitable for connection to an external power supply. Pump portion 64 includes impeller 78 having impellor ports 89 disposed in impeller chamber 80. Motor portion 62 and pump portion 64 of pump 50 are in fluid communication with each other by means of fluid orifice 86 and end bell ports 88 connecting motor chamber 70 with impeller chamber 80.

Rotor 66 and impeller 78 are mounted on a rotatable metallic shaft 90 which extends between the motor portion 62 and the pump portion 64 of housing 60. Shaft 90 is mounted for rotation in housing 60 by means of first and second non-electrically conductive bearings 92 and 94, respectively, each having sleeve surfaces 96 and 98, disposed radially adjacent to and in contact with shaft 90, through a constant oil film, and thrust surfaces 100 and 102. A metal sleeve 103 is mounted on the lower end of the shaft 90, such as by a pressed fit. The thrust surfaces are shown disposed perpendicular to sleeve surfaces 96 and 98, respectively, for purposes of example. However, it is to be understood that the thrust surfaces may be at any angle which will accept thrust loads.

Non-electrically conductive bearings 92 and 94 may be made of suitable resins, laminates, and ceramic materials, either fired or unfired. Glass silicon tubing, type G7, grade number HY-1806, a silicon laminate, sold under the trademark MICARTA by Westinghouse Electric Corporation, has been used successfully in test of a prototype of the preferred embodiment of the invention. Other non-conductive ceramics, resins, and laminates with characteristics of good oil resistance and temperature stability would also be suitable.

First and second metallic thrust collars 104, 106, are rigidly disposed on shaft 90 axially adjacent to and in contact with thrust surfaces 100 and 102, respectively. Thrust surfaces 100 and 102 both face inward and thrust collars 104 and 106 both face outward so as to prevent shaft 90 from movement in either axial direction. Of course, both the thrust surfaces and thrust collars could face vice versa, the important thing being that the thrust surfaces face opposite directions so that the shaft 90 is axially captured.

During operation of pump 50, rotation of impeller 78 moves the fluid to be pumped from the suction side 82 (corresponding to inlet 52 of FIG. 1) of impeller chamber 80 to the pressure side 84 of impeller chamber 80. Since the fluid orifices 86 pass through housing 60 to enter the pressure side 84 of impeller chamber 80, there will be a small bleed off of oil into the motor chamber 70. This oil circulates in the motor chamber 70 cooling motor portion 62 of pump 50 and lubricating the bearings 92 and 94 and subsequently returns to the suction side 82 of the impeller chamber 80 passing through the ports 88 of the housing 60 and impeller conduits 89.

In accordance with this invention, the housing 60 (FIG. 3) comprises bearing blocks 108, 110 for supporting the bearings 92, 94, respectively. As shown by way of example in FIG. 4, the sleeve bearing 92 is seated within an annular bearing carrier 112 within the bore of the block 110 and comprises a radial portion of flange 114 which reinforces the sleeve bearing 92 and disc bearing 116. Carrier 112 is insulated from the surrounding parts 90, 104, 110 by the non-electrically conductive bearings 92, 116 as well as an insulating sleeve 118. In a similar manner, the upper end of the shaft 90 is disposed within the bore of the block 108 where it is secured in place by a bearing carrier 120 which supports sleeve bearing 94 and a disc bearing 122. Electrically insulating sleeve 124 having a radial flange portion 126 insulates the insert 120 from the block 108.

Figure 2:
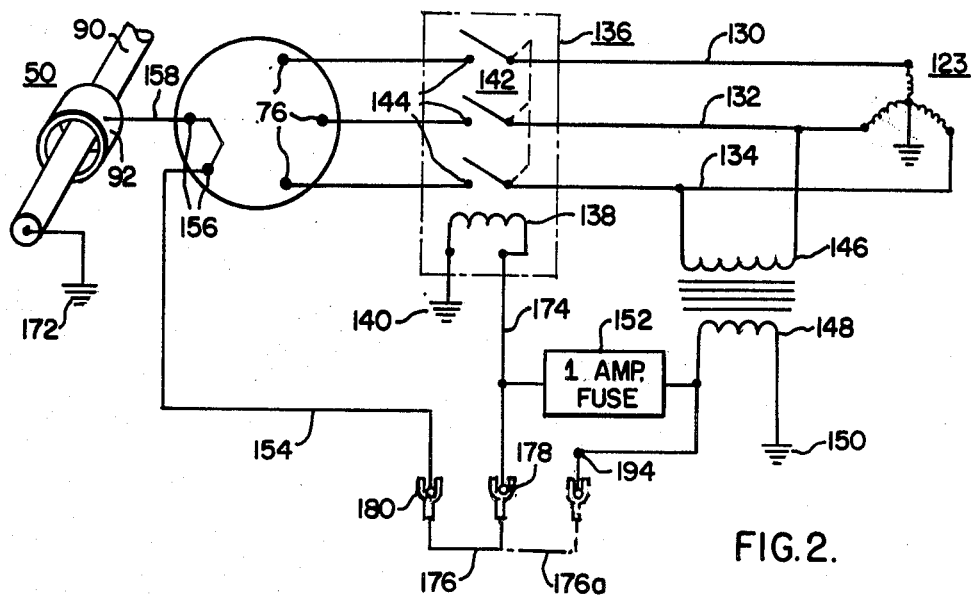
FIG. 2 is a schematic diagram of a circuit used to deenergize a pump when bearing wear is detected in accordance with this invention.
Figure 4:
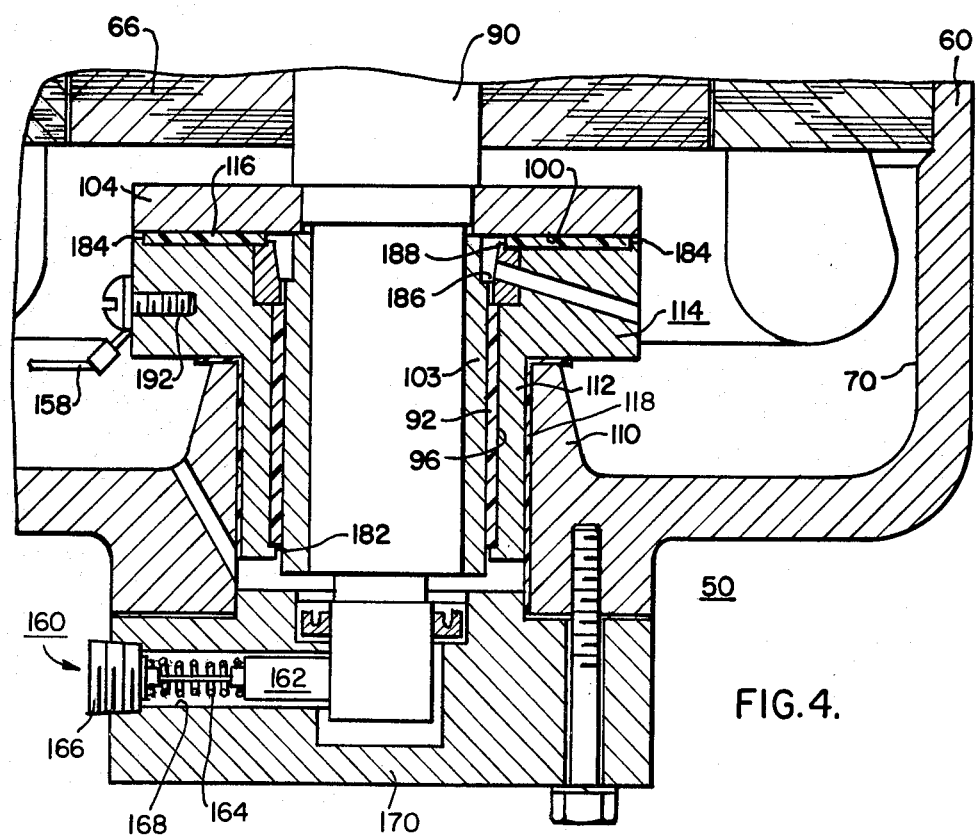
FIG. 4 is an enlarged fragmentary, sectional view of the assembly of the pump shaft and surrounding bearings.

A prompt-trip control circuit for operating the shaft 90 (FIGS. 2 and 6) may be operated from a single phase circuit but is preferably operated from a three-phase power source 123 including conductors 130, 132, 134 which lead through a contactor 136 to terminals 76 for driving the motor portion 50. The contactor 136 includes a solenoid coil 138 having one end grounded at 140. The coil 138 actuates movable contact arms, generally indicated at 142, between open and close positions of stationary contacts 144. Inasmuch as the power source is a three-phase system, various types of power supplies to the pump may be used such as wye-system and delta-system, such as a grounded wye system at 128. Accordingly, an isolation transformer 146 depends from the conductors 132, 134 and is part of a circuit including a secondary coil 148 which is grounded at 150, a circuit interrupter 152 such as a fuse, and a conductor 154 leading to a terminal 156 to a conductor 158 leading to the pump bearing carrier 112 (FIG. 4). Use of the isolation transformer 146 depends upon whether the main circuit is or is not grounded. The circuit also includes a static arrester 160 (FIG. 4) which includes a carbon brush 162, a coil spring 164 and a plug 166 for retaining the brush and spring within a hole 168 in a housing cap 170. The cap 170 surrounds the lower end portion of the shaft 90 for retaining the brush 162 in contact therewith.

Figure 5:
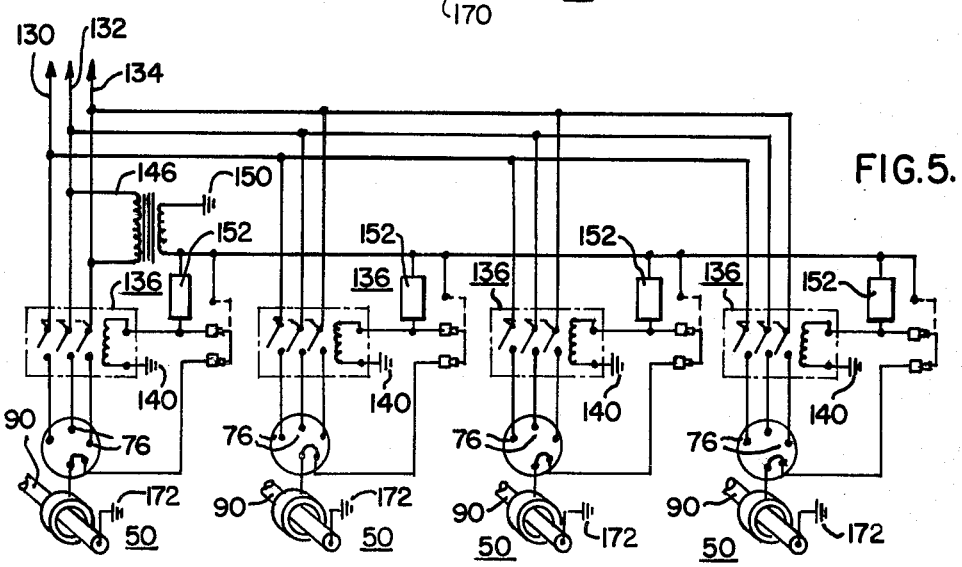
FIG. 5 is a pump-trip circuit control for a plurality of motor-pump units.

The cap 170 is a part of the pump housing 60 which is grounded such as at 172 (FIG. 5).

In operation, power is supplied to the contactor 136 and subsequently to the pump stator terminals 76 and the pump motor when the contactor closes. Power supply can be 2/60, 230 volt 3-phase, or any convenient power. The voltage to the bearing carrier is convenient at 120 volts, but could be higher or lower as is convenient. The isolation transformer 146 transforms the supply to a lower potential, such as 120 V. The reduced potential moves through a circuit interrupter, such as a one ampere fuse 152 through a branch circuit or conductor 174 to the contactor coil 138, the other end of which is grounded at 140.

From the fuse 152 the circuit continues through a connecting device for line 176 which is detachably connected between terminals 178, 180 to terminal 156 on the pump motor from where it moves via conductor 158 to the bearing carriers 112 (FIG. 4). As long as the bearings 92, 94 are not worn, the circuit through the bearing carriers 112, 120 and the shaft 90 is open.

Means for detecting bearing wear are provided in conjunction with the bearings and include annular contact points 182, 184, as well as contact points 186, 188. The annular contact point 182 is preferably an integral part of the bearing carrier 112 and is recessed by a clearance space from the sleeve 103 to avoid contact therewith until the surface of the bearing 92 wears away by a thickness equal to said clearance. The annular contact point 184 is likewise an integral part of the flange 114 of the bearing carrier 112 and is spaced from the thrust surface 100 of the thrust collar 104 in a manner similar to the annular contact point 102. The contact points 186, 188 are parts of a metal sensing ring 190 which is in electrical contact with the metal bearing carrier 112. Like the annular contact point 182, the contact point 186 is recessed from the metal sleeve 103 to avoid contact therewith until such time as the bearing 92 wears away. The annular contact point 188, like the contact point 184 is likewise spaced or recessed from the thrust surface 100 to avoid contact therewith until such as time as the disc bearing 116 wears away. Manifestly, all of the annular contact points 182, 184, 186, 188 together with the bearing carrier 112 are part of the circuit including the conductor 158. Moreover when and if the bearing 92 and/or 116 wears away by a distance sufficient to cause contact between one or more points 182, 184, 186, or 188 and the corresponding metal sleeve 103 and/or thrust collar 104, a circuit is closed through the conductor 158, which is secured to the bearing carrier 112 by a screw 192.

As was set forth above, the static arrester 160 is a connection between the shaft 90 and ground. The shaft 90 and all rotator parts are thus grounded, preventing static charge buildup on these parts and the inherent problems associated therewith are avoided. A second function of the static arrester 160 is to complete a circuit if and when the insulating materials of the bearings 92, 94, 102, 116 wear and the associated metal parts including the bearing carrier contact the shaft in any manner.

If such contact occurs, the shaft 90, being grounded, completes the circuit from ground 172 and 150 at the coil 148, and hence through the fuse 152, the connecting device 176, terminals 156 of the pump to the bearing 92 through the metal contact of the worn bearing to the shaft 90, causing an excessive current to flow through the fuse 152. As a result the fuse 152 is blown and thereby opens a circuit through the contactor coil 138 to open the supply through the contactor 136 and deenergize the pump, whereby subsequent damage to the pump is avoided and prevents further contamination of the transformer oil.

The circuit shown functions only with the transformer secondary coil 148 isolated to ground, one terminal of the coil being connected to ground and the shaft 90 connected to ground. This is required to complete the trip circuit. Any ungrounded system replacing this circuit would require additional wiring between the transformer 146 and the coil 148, and the shaft 90 of the pump with the shaft isolated to take the voltage of the transformer low. In such case, static build up could occur on the shaft and all of the problems previously set forth for the static charge build up with discharges and subsequent damage, would remain inherent in the system.

In normal operation, the connecting device for link 176 is positioned between terminals 178, 180 so that the fuse 152 is between the isolation transformer and the contactor coil 138. However, if for any reason it is desirable to override the fuse to keep the pump operating, the connecting device or link 176 may be moved to the broken line position 176a.

Figure 7:
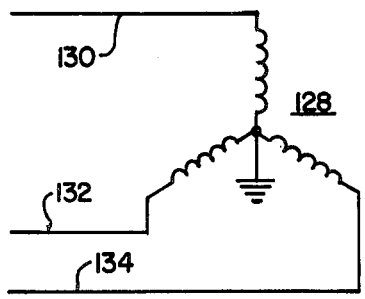
FIGS. 7–10 are circuits of various types of power which may be used for operating the motor-pump unit.
Figure 9:
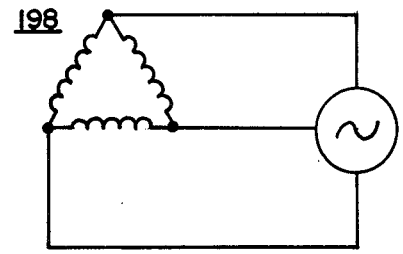
Figure 8:
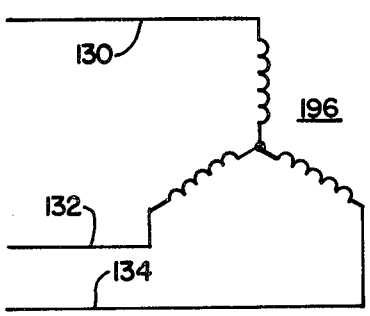
Figure 10:
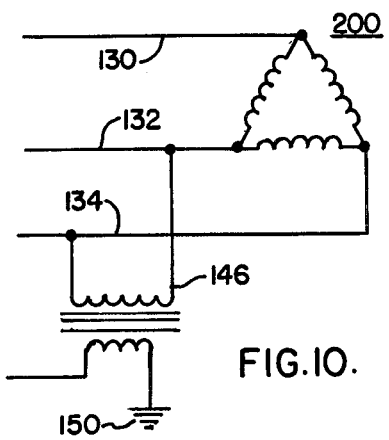

It is noted that various types of power supplies to the pump may be provided including grounded wyes 128 (FIGS. 2, 7) ungrounded wyes 196 (FIG. 8), ungrounded delta 198 (FIG. 9), as well as an ungrounded delta operative through the transformer 146 which is grounded at 150 (FIG. 10). Where ungrounded three-phase systems such as the wye 196 (FIG. 8) and the delta 198 (FIG. 9) are used, the circuit must be grounded at some point upstream of the circuit interrupter 152 such as shown in the delta system 200 (FIG. 10).

In addition to the foregoing, although three-phase systems have been set forth above, another system such as a single phase may be provided so long as the circuit through the circuit interrupter 152 is grounded upstream thereof. Indeed, if a single phase power supply is provided, the isolation transformer may be omitted, or a one-to-one transformer may be provided, so long as the circuit is grounded upstream of the circuit interrupter 152.

In FIG. 5, a plurality of motor-pump units 50 are shown connected to separate pump-trip circuits for control of each unit. The separate circuits are in turn connected to a single isolation transformer 146 leading to the separate isolation transformer 152.

Figure 6:
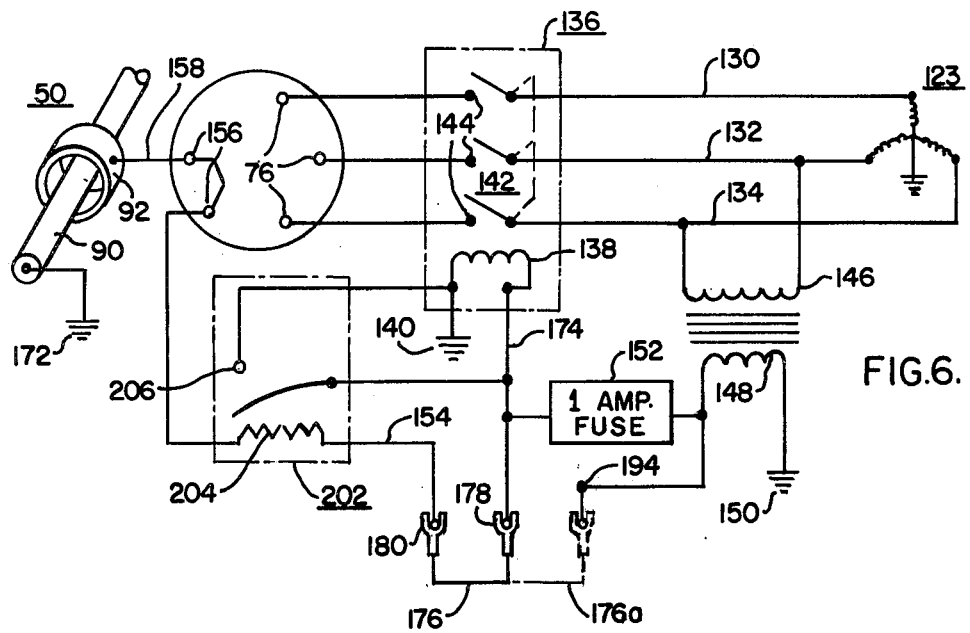
FIG. 6 is a schematic view of another embodiment of the invention and including a time delay relay.

Another embodiment of the invention is shown in FIG. 6 which incorporates a time delay relay 202. For simplicity, inasmuch as all other parts of the circuit of FIG. 6 are similar to those of FIG. 2, all parts are identified with similar reference numbers. In normal operation, the connecting device or link 176 is positioned across the terminals 178, 180. The circuit interrupter or fuse 152 is disposed between the isolation transformer 146 and the contactor coil 138 and a relay coil 204. When power is supplied from the source 128, the contactor coil 138 is energized to ground and the pump 50 is turned on. The time delay relay 202 is not energized because the circuit through the coil 204 is open at the interface between the pump bearings 92, 94 and the shaft 90, the bearings being composed of non-conducting material. Accordingly, the pump operates.

When one or both bearings 92, 94 wear sufficiently that one or more of the contact points 182, 184, 186, 188 touches the shaft 90, the circuit is closed to ground 170 through the static arrester 160, whereupon the time delay relay coil 204 is energized and after a predetermined period, such as three to five seconds, causes the time delay relay contacts 206 to close, thereby making a direct short to ground 150 through the fuse 152 from the isolation transformer coil 148 causing the fuse to blow. With the fuse blown, the contactor coil 138 is deenergized and the pump stopped. Finally, if it is desirable to operate the pump 50, disregarding any failure in an emergency, the connecting device or link 176 may be moved between terminals 178, 194 (FIG. 2), thus shorting the blown fuse and reenergizing the contactor coil 138 and the pump 50.

Accordingly, to obtain all of the advantages, i.e., elimination of static buildup (and thus discharge) on the moving shaft and rotor parts of the pump and to simplify the desirable trip circuit, the unique combination of the static arrester to the shaft and the isolation control circuit is necessary. The combination of the static arrester and the grounded isolated trip circuit is the means for eliminating static discharge and conducting debris generation from the shaft of the transformer oil pump and still provide a simple trip circuit for all forms of power supplied to pumps to shut down the pump should the bearings fail.

What is claimed is:

1. A motor-pump unit for circulating a fluid, comprising:
   (a) a housing having a motor portion and a pump portion including a motor and a pump respectively;
   (b) a rotatable, electrically conductive shaft extending between the motor and the pump;
   (c) first and second sleeve bearings mounted on the shaft for rotation in the housing;
   (d) each bearing having a sleeve surface disposed radially adjacent to and in contact with the periphery of the shaft;
   (e) at least one of the bearings including the bearing constructed of non-electrically conductive material including a recess in the surface thereof;
   (f) detecting means for detecting bearing wear including an electrically conductive contact ring in the recess to effect an electrical connection between the contact ring through the shaft upon a predetermined displacement of the shaft due to wear of the bearing sleeve;
   (g) means electrically connecting the shaft to ground;
   (h) a ground source of electrical energy at a predetermined voltage and including electrical conductor means leading to the motor;
   (i) a circuit breaker in the electrical conductor means and comprising an actuating coil having a first end connected to ground and having another end;
   (j) a circuit leading from the grounded source of electrical energy to the electrically conductive contact ring;
   (k) the circuit including a circuit interrupter having a predetermined breakdown rating and including a branch conductor connected between the other end of the actuating coil and the downstream end of the circuit interrupter;
   whereby static electricity buildup is prevented on the moving parts of the motor portions and pump portions and a trip circuit is provided for the motor portions.

2. The unit of claim 1 in which the circuit comprises an isolation transformer having a grounded secondary coil on the upstream side of the circuit interrupter.

3. The unit of claim 2 in which the circuit interrupter is a fuse having a predetermined rating whereby, upon closure of the circuit through the detecting means, an excess current blows the fuse thereby opening the circuit and the actuating coil.

4. The unit of claim 1 in which the first and second sleeve bearings are constructed of non-electrically conductive material, in which each sleeve bearing includes a recess in the surface thereof, and in which an electrically conductive contact ring is contained in each recess.

5. The unit of claim 4 in which at least one of the first and second bearings includes a thrust surface disposed at a predetermined angle relative to the sleeve surface which will accept thrust loads;

an electrically conductive thrust collar on the shaft axially adjacent to the thrust surface, in which the thrust surface includes a recess, in which an electrically conductive contact ring is disposed in the recess to effect an electrical connection between the ring and the corresponding thrust collar upon a predetermined axial displacement of the shaft due to wear of the thrust surface.

6. The unit of claim 1 wherein the grounded source of energy includes an isolation transformer having a grounded secondary winding.

7. The unit of claim 1 wherein the grounded source of energy includes a power transformer having a grounded secondary winding.

8. The unit of claim 1 wherein the grounded source of energy includes a power transformer having an ungrounded secondary winding and an isolating transformer having a primary winding connected to the ungrounded secondary winding of the power transformer, and a grounded secondary winding.

9. The unit of claim 1 wherein the circuit comprises time delay relay means for delaying for a predetermined time the deenergization of the circuit breaker and resulting stopping of the pump, the relay including a normally open circuit breaker having an actuating coil disposed in the circuit, and having a stationary contact and movable contact between the circuit interrupter and ground.

10. The unit of claim 1 wherein override means are provided for overriding the circuit interrupter, whereby operation of the pump continues when the circuit interrupter is open.

* * * * *